United States Patent
Robbert et al.

(10) Patent No.: US 10,428,983 B2
(45) Date of Patent: Oct. 1, 2019

(54) EXHAUST COLLAR AND METHOD FOR FLEXIBLY ATTACHING AN EXHAUST FUNNEL FOR AN EXHAUST HOOD TO A VENT PIPE AND EXHAUST FUNNEL DEVICE

(71) Applicant: Miele & Cie. KG, Guetersloh (DE)

(72) Inventors: Andreas Robbert, Ense-Luettringen (DE); Gerd Eckardt, Sundern (DE); Dirk Schuesseler, Arnsberg (DE)

(73) Assignee: MIELE & CIE. KG, Guetersloh (DE)

( * ) Notice: Subject to any disclaimer, the term of this patent is extended or adjusted under 35 U.S.C. 154(b) by 290 days.

(21) Appl. No.: 15/470,941

(22) Filed: Mar. 28, 2017

(65) Prior Publication Data
US 2017/0284576 A1    Oct. 5, 2017

(30) Foreign Application Priority Data
Mar. 29, 2016  (DE) .................. 10 2016 105 667

(51) Int. Cl.
*F16L 23/024*  (2006.01)
*A47J 27/00*   (2006.01)
*F16L 23/16*   (2006.01)

(52) U.S. Cl.
CPC ............ *F16L 23/024* (2013.01); *A47J 27/00* (2013.01); *F16L 23/16* (2013.01)

(58) Field of Classification Search
CPC ........... F16L 23/024; F16L 23/16; A47J 27/00
USPC ...................................... 285/142.1, 219, 220
See application file for complete search history.

(56) References Cited

U.S. PATENT DOCUMENTS

| | | | | |
|---|---|---|---|---|
| 4,584,929 A | * | 4/1986 | Jarmyr | B08B 15/02 126/299 D |
| 5,121,948 A | * | 6/1992 | Anderson | D06F 58/20 285/145.1 |
| 6,745,491 B1 | * | 6/2004 | Hernandez-Zelaya | D06F 58/20 34/138 |
| 2007/0099558 A1 | * | 5/2007 | Oagley | F24C 15/20 454/257 |

FOREIGN PATENT DOCUMENTS

| | | |
|---|---|---|
| DE | 1993297 U | 9/1968 |
| DE | 8108118 U1 | 8/1981 |
| DE | 8716865 U1 | 2/1988 |
| DE | 4443005 A1 | 6/1995 |

* cited by examiner

*Primary Examiner* — James M Hewitt, II
(74) *Attorney, Agent, or Firm* — Leydig, Voit & Mayer, Ltd.

(57) ABSTRACT

An exhaust funnel device includes an exhaust collar; a clamping element; and an exhaust funnel for an exhaust hood. The exhaust funnel is flexibly attached by the clamping element to the exhaust collar and to a vent pipe. The exhaust collar includes a tubular fixing unit for fixing the exhaust collar to the vent pipe as well as an annular holding unit, the annular holding unit and the clamping element being able to clamp at least a portion of an exhaust funnel wall of the exhaust funnel between the holding unit and the clamping element.

10 Claims, 10 Drawing Sheets

EXHAUST COLLAR AND METHOD FOR FLEXIBLY ATTACHING AN EXHAUST FUNNEL FOR AN EXHAUST HOOD TO A VENT PIPE AND EXHAUST FUNNEL DEVICE

CROSS-REFERENCE TO PRIOR APPLICATION

Priority is claimed to German Patent Application No. DE 10 2016 105 667.7, filed on Mar. 29, 2016, the entire disclosure of which is hereby incorporated by reference herein.

FIELD

The approach presented here relates to an exhaust collar and a method for flexibly attaching an exhaust funnel for an exhaust hood to a vent pipe, and to an exhaust funnel device.

BACKGROUND

The position of a vent pipe installed on-site for an exhaust hood often differs from the position specified in the installation instructions for the vented operation of the exhaust hood. A flex hose is used to compensate for these positional inaccuracies. The connection between a flex hose and an exhaust collar of an exhaust hood is described in Patent Publications DE 44 43 005 A1 and DE 81 08 118 U1. In case of lack of space, or due to legal provisions, it is often difficult or impossible to use a flex hose.

Another option is to create a flexible connection between an exhaust collar to be mounted to the housing of the exhaust hood. To this end, Patent Publications DE 19 93 297 U and DE 87 16 865 U1 describe fixing an exhaust collar between the housing of the exhaust hood and a clamping element.

SUMMARY

In an embodiment, the present invention provides an exhaust funnel device comprising: an exhaust collar; a clamping element; and an exhaust funnel for an exhaust hood, the exhaust funnel being flexibly attached by the clamping element to the exhaust collar and to a vent pipe. The exhaust collar includes a tubular fixing unit configured to fix the exhaust collar to the vent pipe as well as an annular holding unit, the annular holding unit and the clamping element being configured to clamp at least a portion of an exhaust funnel wall of the exhaust funnel between the holding unit and the clamping element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
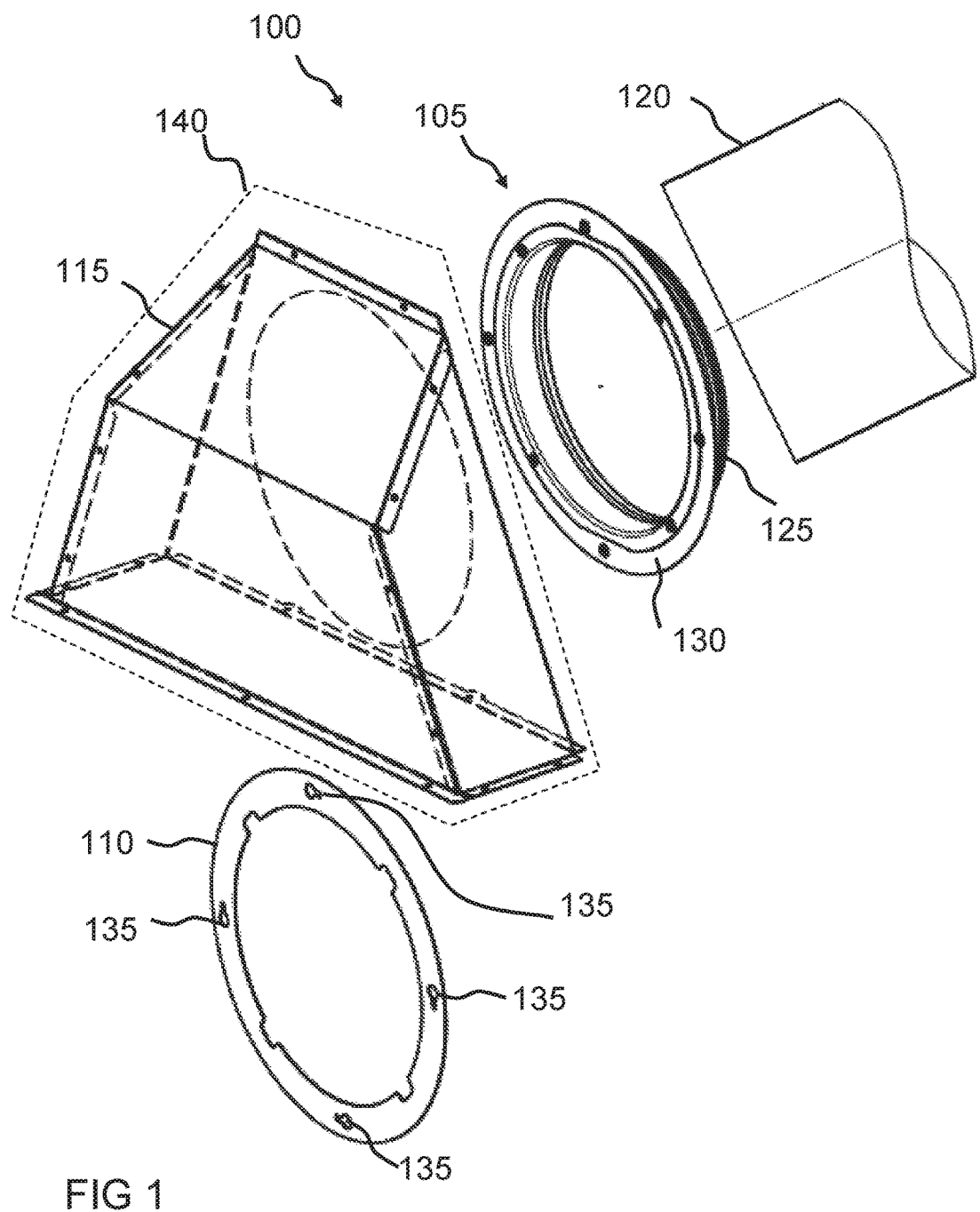
FIG. 1 is a perspective exploded view of an exhaust funnel device according to an exemplary embodiment.

The approach presented here offers the advantage that, by occupying little space, an exhaust funnel of, for example, an exhaust hood can be flexibly attached to a vent pipe and is thus capable of compensating for positional inaccuracies. Advantageously, it is no longer necessary to use a very space-consuming flex hose.

An exhaust collar for flexibly attaching an exhaust funnel for an exhaust hood to a vent pipe has at least a tubular fixing unit for fixing the exhaust collar to the vent pipe. Moreover, the exhaust collar includes an annular holding unit disposed at one end of the fixing unit and configured to hold a clamping element for flexibly attaching the exhaust funnel to the exhaust collar.

The fixing unit may, for example, be configured as a tubular external thread formed around an outer surface of the exhaust collar. In order to fix the exhaust collar to the vent pipe, the exhaust collar may then be threaded or inserted into an inner thread in an inner surface of the vent pipe.

One advantage of the design according to the present invention manifests itself in particular in that the exhaust funnel is clamped between the exhaust collar attached to the vent pipe and the clamping element. This allows the exhaust funnel to be flexibly movable when in the clamped state.

In accordance with an embodiment, the holding unit and the clamping element may have at least one through-hole for receiving a fastening device, such as a screw, for attaching the exhaust collar to the clamping element.

An outer circumference of the fixing unit may be smaller than an outer circumference of the holding unit. Thus, the fixing unit may be received in the vent pipe and the holding unit may project radially around an end of the vent pipe. Here, the exhaust funnel may be clamped in an ideal manner, for example, between the holding unit and the clamping element.

An exhaust funnel device includes one of the presented exhaust collars, the described clamping element and the exhaust funnel, the exhaust funnel being attached by the clamping element to the exhaust collar. This can be made possible, for example, by a fastening device in the form of a screw, which may be threaded through the through-holes of the exhaust collar and the clamping element.

The holding unit and the clamping element may be configured to clamp a wall of the exhaust funnel at least partially between the holding unit and the clamping element.

In accordance with an embodiment, the exhaust funnel device may also include a counter-clamping element disposed on a side a wall of the exhaust funnel opposite the clamping element and configured to be attachable to the clamping element so as to clamp the holding unit and the exhaust funnel wall at least partially between the clamping element and the counter-clamping element. Thus, both the exhaust funnel and the exhaust collar may be movable relative to each other, thereby enhancing the flexibility of the exhaust funnel device.

The counter-clamping element and/or the clamping element may have at least one through-hole for receiving a fastening device, such as a screw, for attaching the counter-clamping element to the clamping element. In this embodiment as well, a screw may allow the counter-clamping element to be easily and reliably attached to the clamping element.

A rear side of the holding unit may be configured as a contact surface for the counter-clamping element. Similarly, at least a portion of a front side of the holding unit may be correspondingly configured as a contact surface for the clamping element, and thus the holding unit, and, for example, also the adjacent exhaust funnel, may be clamped from two sides.

The exhaust funnel device presented here may include at least one sealing element configured to be disposed between the exhaust collar and the clamping element and/or between the exhaust collar and the exhaust funnel and/or between the exhaust collar and the vent pipe. The sealing element may provide sealing between the respective aforementioned components and protect them from wear.

It is particularly preferred that a sealing element engage the clamping element and the exhaust funnel wall. This allows the sealing element, and, in particular, the position of the sealing element relative to the clamping element, to be continuously checked during the mounting of the exhaust funnel to the exhaust collar, which is preferably done from the side of the clamping element.

In accordance with another embodiment, the sealing element overlaps the edge of the opening in the exhaust funnel wall and engages the clamping element, on the one hand, and the exhaust funnel wall and the exhaust collar, on the other hand. This embodiment eliminates the need for an additional sealing element between the exhaust collar and the exhaust funnel wall.

In an embodiment, the exhaust funnel device may include the vent pipe, the exhaust funnel device being fixed to the vent pipe. To this end, the exhaust funnel device may be threaded into the vent pipe by means of the fixing device.

A method for flexibly attaching an exhaust funnel for an exhaust hood to a vent pipe includes at least a fixing step, in which one of the exhaust collars presented here is fixed to the vent pipe. In a placement step, the exhaust funnel is placed on the exhaust collar. In a final attaching step, the exhaust funnel is flexibly attached to the exhaust collar using a clamping element, the clamping element being positioned and/or fixed on the exhaust funnel and the exhaust collar.

FIG. 1 shows, in perspective exploded view, an exhaust funnel device 100 according to an exemplary embodiment. Exhaust funnel device 100 may be intended for an exhaust hood such as is used, for example, in the household for removing vapors generated during the preparation of foods. Exhaust funnel device 100 includes an exhaust collar 105, a clamping element 110 and an exhaust funnel 115, the exhaust funnel 115 being attached by clamping element 110 to exhaust collar 105. Optionally, the exhaust funnel device 100 according to this exemplary embodiment includes a vent pipe 120. Typically, vent pipe 120 is built into a wall.

Exhaust collar 105 includes a tubular fixing unit 125 and an annular holding unit 130. Fixing unit 125 is configured to fix exhaust collar 105 to vent pipe 120. Holding unit 130 is disposed at one end of fixing unit 125 and configured to hold clamping element 110, thereby flexibly attaching exhaust collar 105 to exhaust funnel 115.

Clamping element 110 is annular in shape and, in this exemplary embodiment, has a plurality of through-holes 135 in addition to a central through-hole.

The exhaust collar 105 presented here makes it possible to accommodate positional inaccuracies of vent pipe 120; i.e., measurement inaccuracies, faulty installation of vent pipe 120 in a wall, for example.

For a so-called floating exhaust collar mounting arrangement, which may also be referred to as exhaust collar connector, exhaust collar 105 is pre-mounted at the position of vent pipe 120, which may already be installed on-site and may also be referred to as connecting pipe. Exhaust funnel 115, which forms part of an exhaust hood 140 (abbreviated as EH), or, in an alternative exemplary embodiment, forms part of a fan unit, is suspended on vent pipe 120 at a predetermined position specified in an operating manual. Exhaust fan 115 may also be a housing of an exhaust venting device. The holes in exhaust collar 105 and the outer collar geometry in the form of contact surface 130 make it possible to accommodate any type of deviations. In order to be able to accommodate the greatest possible deviations, the size of exhaust funnel 115 in dependence with the exhaust collar 105 is a decisive factor. In order to connect the two assemblies, a clamping ring in the form of clamping element 110 is placed over through-holes 135, which, by way of example, are shaped as keyholes, and subsequently connected thereto by tightening screws.

Figure 2:
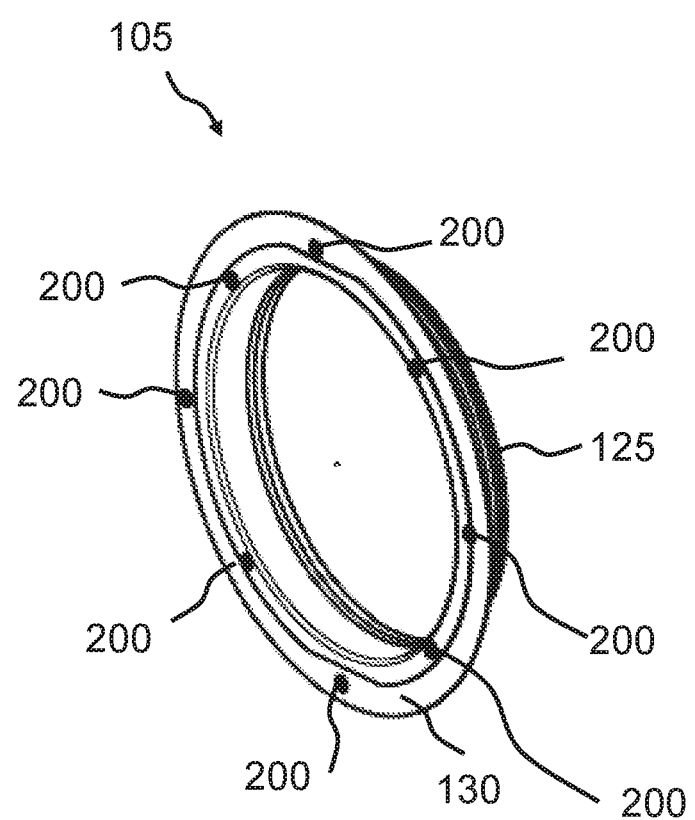
FIG. 2 is a perspective view of an exhaust collar according to an exemplary embodiment.

FIG. 2 shows, in perspective view, an exhaust collar 105 according to an exemplary embodiment. This may be the exhaust collar 105 described with reference to FIG. 1. The exhaust collar 105 according to this exemplary embodiment includes a fixing unit 125 configured as a tubular external thread and adapted for fixing exhaust collar 105 to the vent pipe. In accordance with this exemplary embodiment, an outer circumference of fixing unit 125 is smaller than an outer circumference of holding unit 130, which extends like a flange around fixing unit 125. In order to attach holding unit 130 to the clamping element, the holding unit 130 according to this exemplary embodiment has eight through-holes 200 for receiving eight screws. Through-holes 200 are spaced at regular intervals radially all around holding unit 130.

Figure 3:
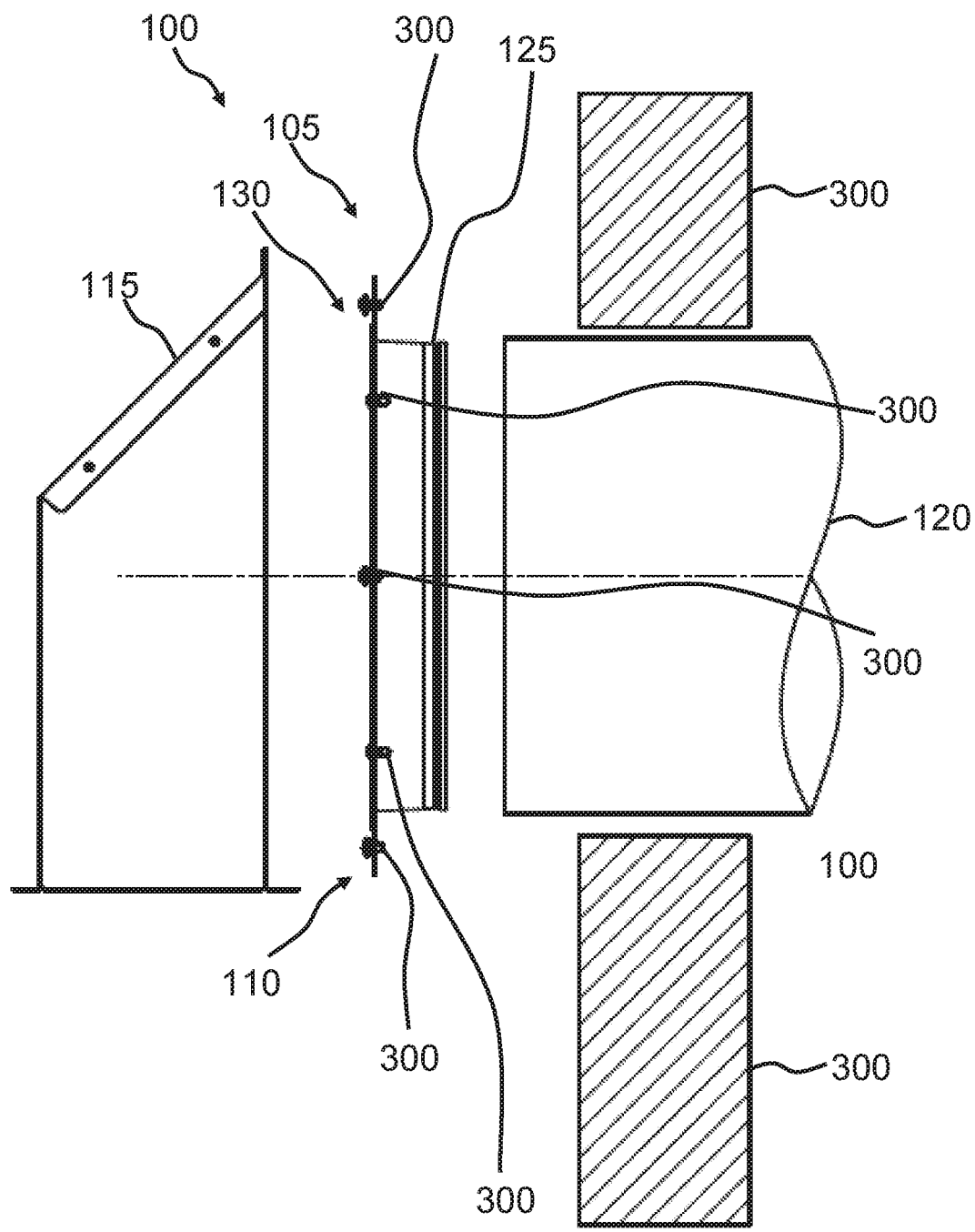
FIG. 3 is an exploded side view of an exhaust funnel device according to an exemplary embodiment.

FIG. 3 shows, in exploded side view, an exhaust funnel device 100 according to an exemplary embodiment. This may be the exhaust funnel device 100 described with reference to FIG. 1 with the exhaust collar 105 described with reference to FIG. 2. In accordance with this exemplary embodiment, vent pipe 120 is incorporated into a wall 300. According to this exemplary embodiment, clamping element 110 is attached to exhaust collar 105 by a plurality of screws 300. To this end, screws 300 are inserted into the through-holes of clamping element 110 and the through-holes of holding unit 130.

Figure 4:
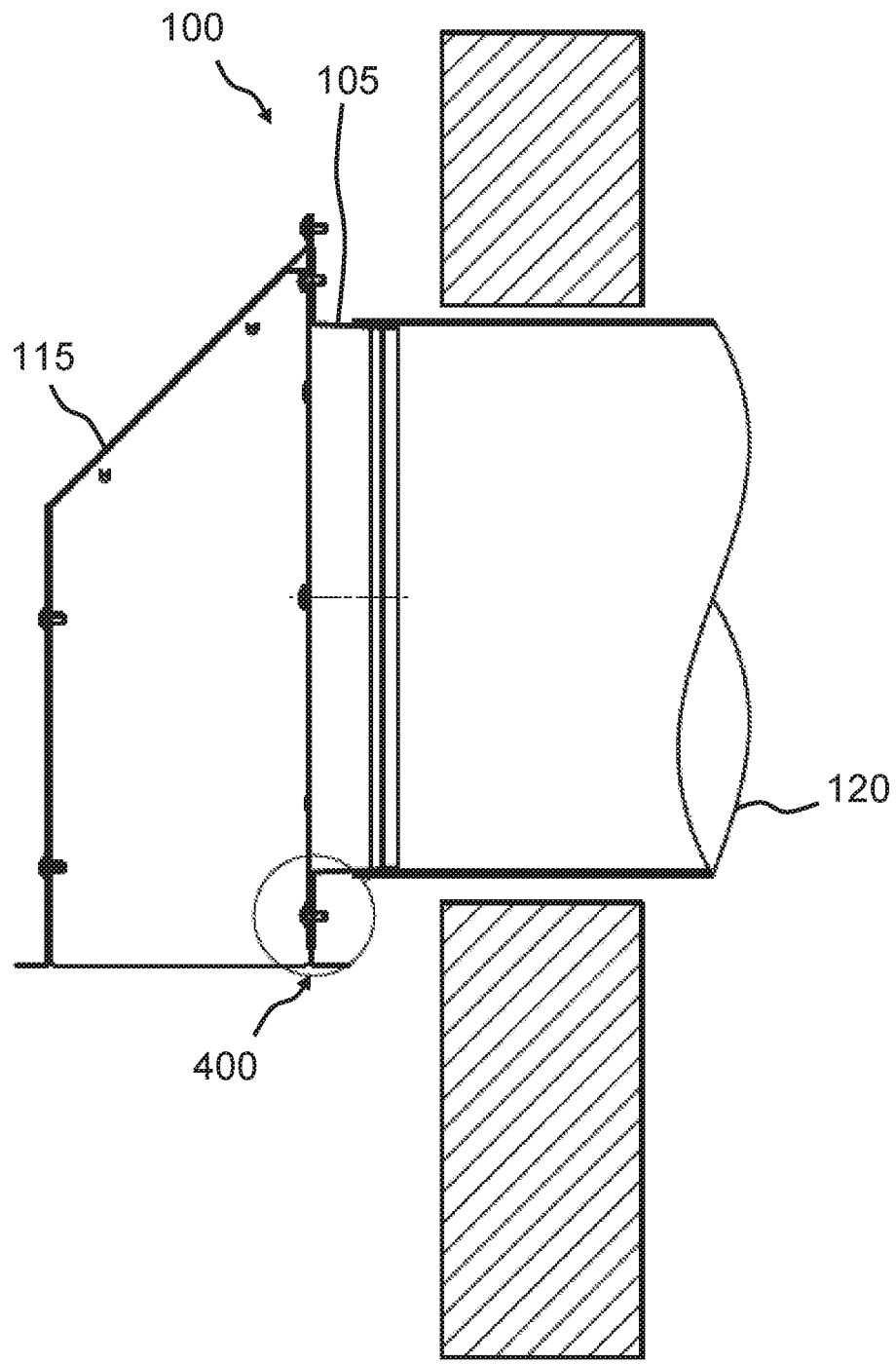
FIG. 4 is a schematic side view of an exhaust funnel device according to an exemplary embodiment.

FIG. 4 shows, in schematic side view, an exhaust funnel device 100 according to an exemplary embodiment. This may be the exhaust funnel device 100 described with reference to FIG. 3. A detail 400 shows a flexible attachment of exhaust funnel 115 to vent pipe 120. An enlarged view of detail 400 is provided in FIG. 5.

Figure 5:
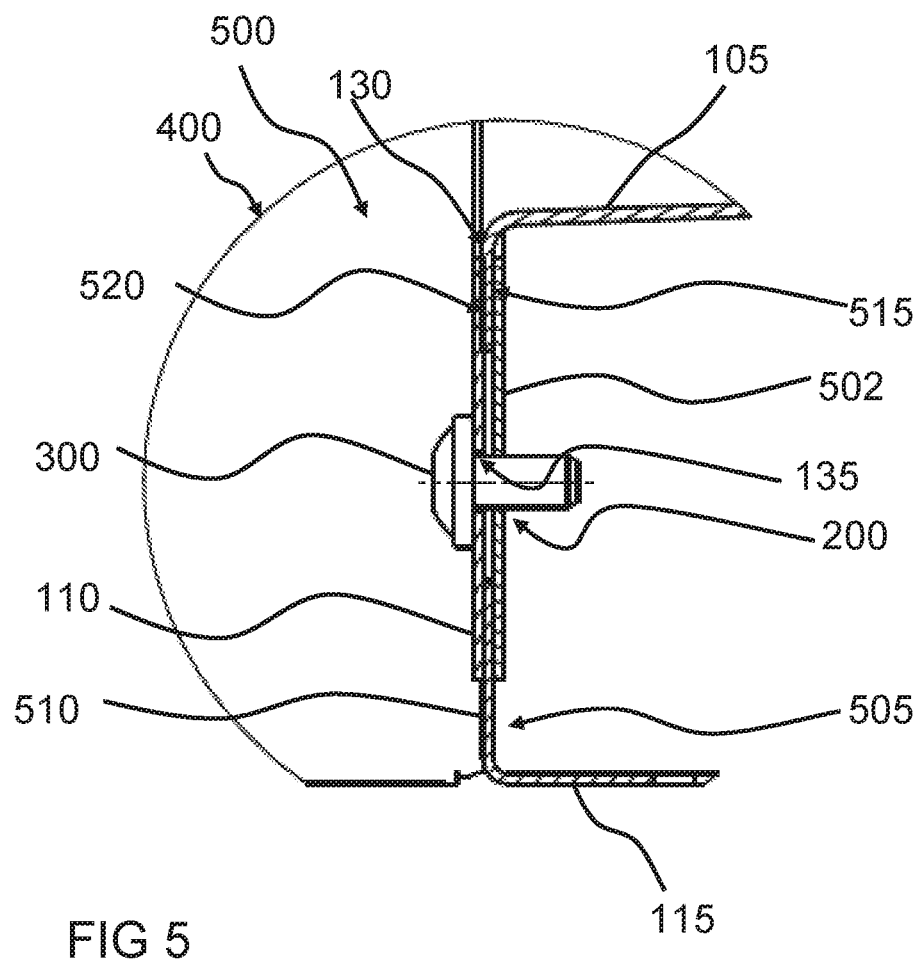
FIG. 5 is a cross-sectional view of a flexible attachment according to an exemplary embodiment.

FIG. 5 shows, in cross-sectional view, a flexible attachment 500 according to an exemplary embodiment. This may be the flexible attachment illustrated in FIG. 4 in the portion 400 of exhaust funnel 115 at the vent pipe. In accordance with this exemplary embodiment, the exhaust funnel device includes a counter-clamping element 502. Counter-clamping element 502 is disposed on a side 505 of a wall 510 of exhaust funnel 115 opposite the clamping element 110 and configured to be attachable to clamping element 110 so as to clamp holding unit 130 and exhaust funnel wall 510 at least partially between clamping element 110 and counter-clamping element 502.

In accordance with this exemplary embodiment, a rear side 515 of holding unit 130 is configured as a contact surface for counter-clamping element 502, and a front side 520 of holding unit 130 opposite the rear side 515 is configured as a contact surface for clamping element 110. In accordance with an alternative exemplary embodiment, only a portion of front side 520 may be configured as a contact surface for clamping element 110.

According to this exemplary embodiment, counter-clamping element 502 and clamping element 110 have through-holes 200, 135 for receiving screws 300 for attaching counter-clamping element 502 to clamping element 110. According to this exemplary embodiment, holding unit 130 of exhaust collar 105 does not have a through-hole.

Figure 6:
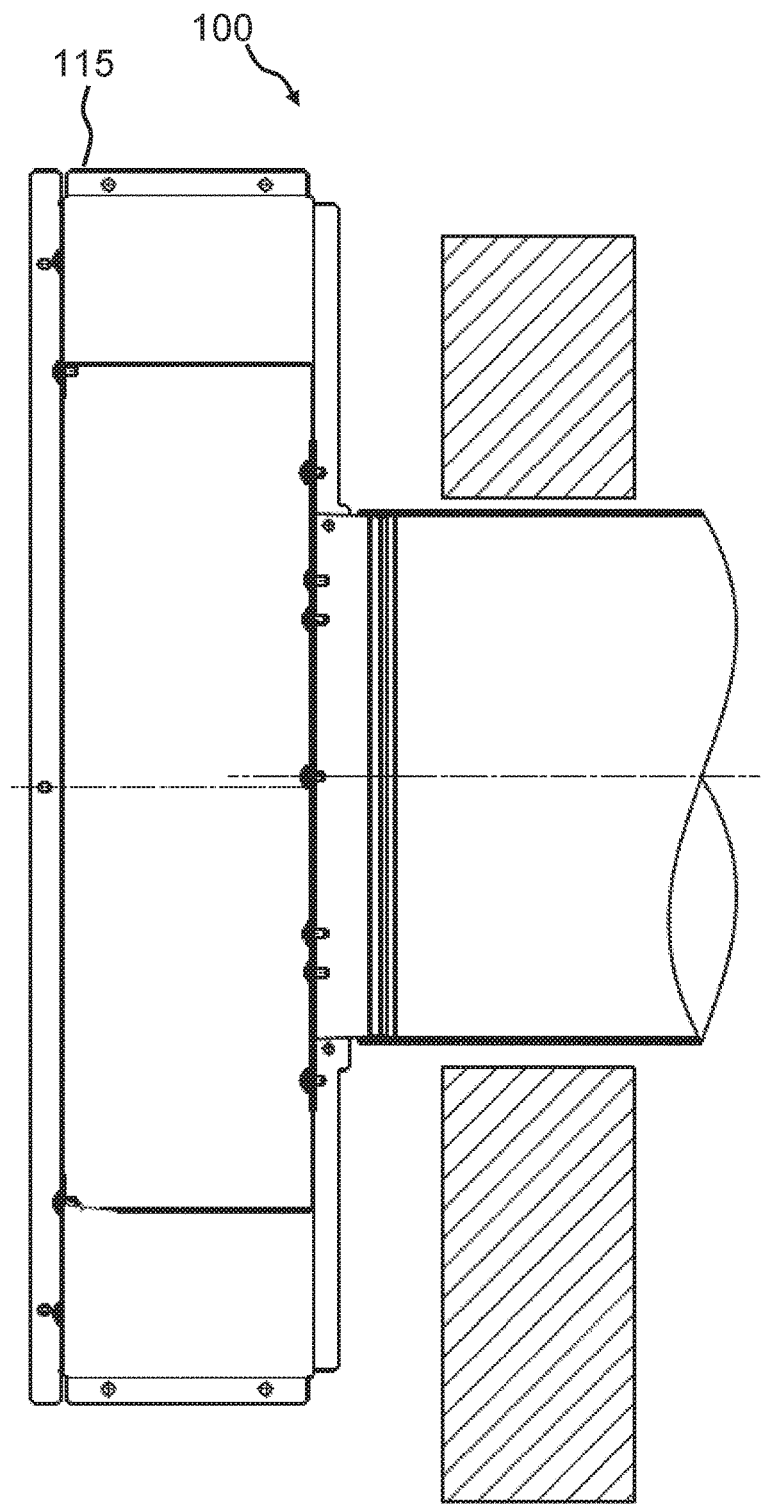
FIG. 6 is a schematic side view of an exhaust funnel device according to an exemplary embodiment.

FIG. 6 shows, in schematic side view, an exhaust funnel device 100 according to an exemplary embodiment. This may be the exhaust funnel device 100 described with reference to FIG. 4. In accordance with this exemplary embodiment, exhaust funnel 115 is shown from below.

Figure 7:
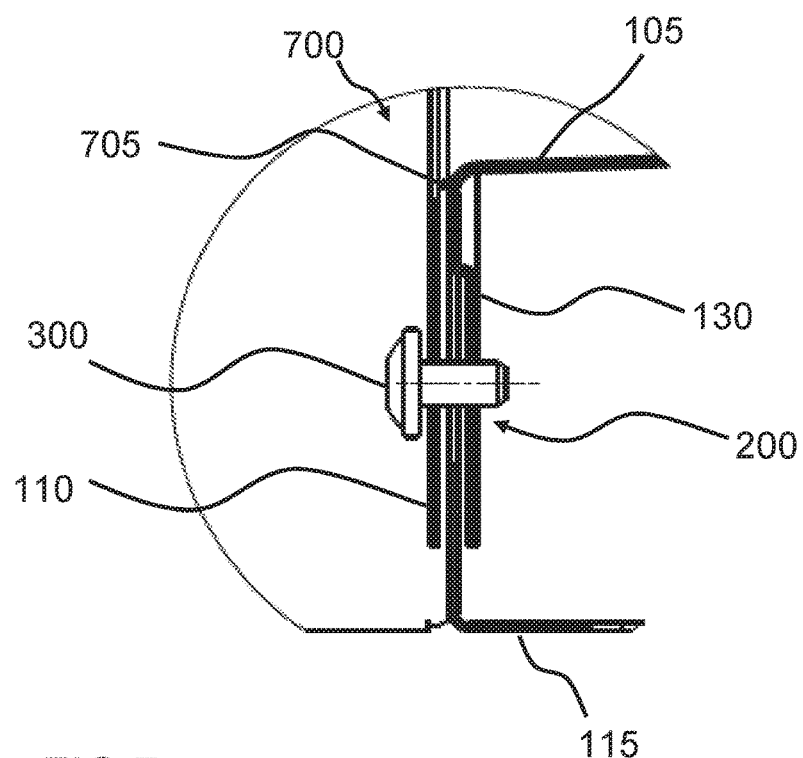
FIG. 7 is a cross-sectional view of a flexible attachment according to an exemplary embodiment.

FIG. 7 shows, in cross-sectional view, a flexible attachment 700 according to an exemplary embodiment. This may be the attachment described with reference to FIG. 5, with the difference that the attachment 700 according to this exemplary embodiment does not have a counter-clamping element and that holding unit 130 has the through-hole 200 for receiving screw 300.

According to this exemplary embodiment, only a portion 705 of the front side of holding unit 130 is configured as a contact surface for clamping element 110. In accordance with this exemplary embodiment, holding unit 130 and clamping element 110 are configured to clamp wall 510 of exhaust funnel 115 at least partially between holding unit 130 and clamping element 110.

Figure 8:
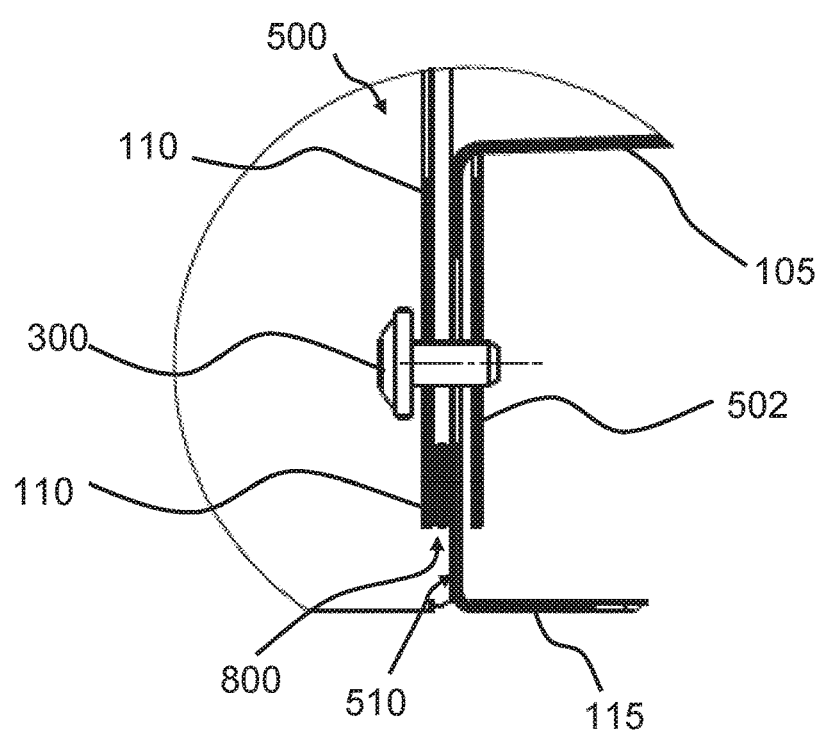
FIG. 8 is a cross-sectional view of a flexible attachment according to an exemplary embodiment.

FIG. 8 shows, in cross-sectional view, a flexible attachment 500 according to an exemplary embodiment. This may be the attachment described with reference to FIG. 5, with the difference that the attachment 500 according to this exemplary embodiment has a sealing element 800. In accordance with this exemplary embodiment, sealing element 800, which may also be referred to as sealing means, is disposed between clamping element 110 and exhaust funnel wall 510.

Figure 9:
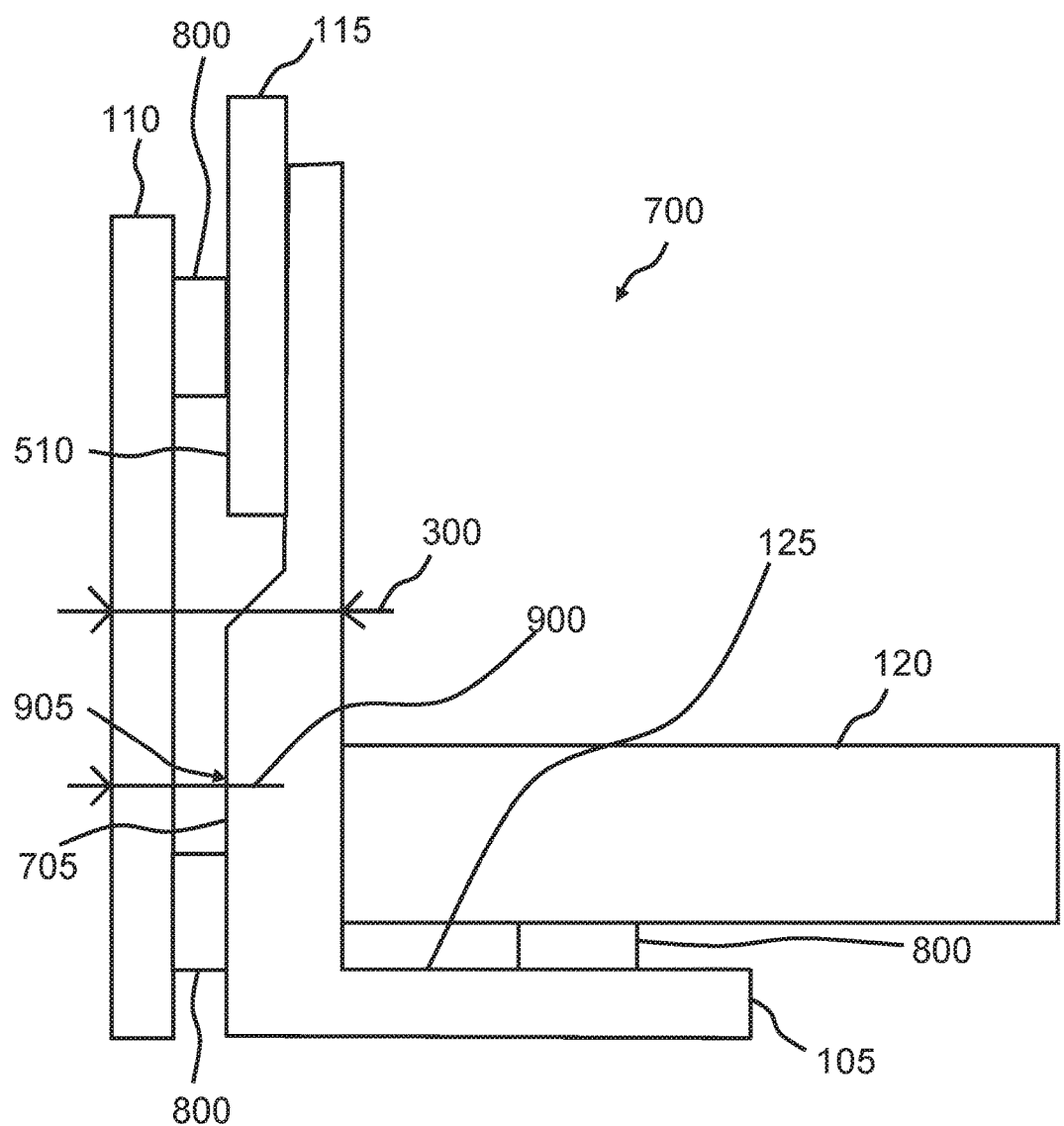
FIG. 9 is a cross-sectional view of a flexible attachment according to an exemplary embodiment.

FIG. 9 shows, in cross-sectional view, a flexible attachment 700 according to an exemplary embodiment. This may be the attachment described with reference to FIG. 7, with the difference that the attachment 700 according to this exemplary embodiment has a plurality of sealing elements 800 and an additional screw 900. Sealing elements 800 are disposed between clamping element 110 and exhaust funnel wall 510, between clamping element 110 and portion 705, and between vent pipe 120 and fixing unit 125. Additional screw 900 is threaded through clamping element 110 into portion 705. To this end, portion 705 has a recess 905 for receiving additional screw 900.

Figure 10:
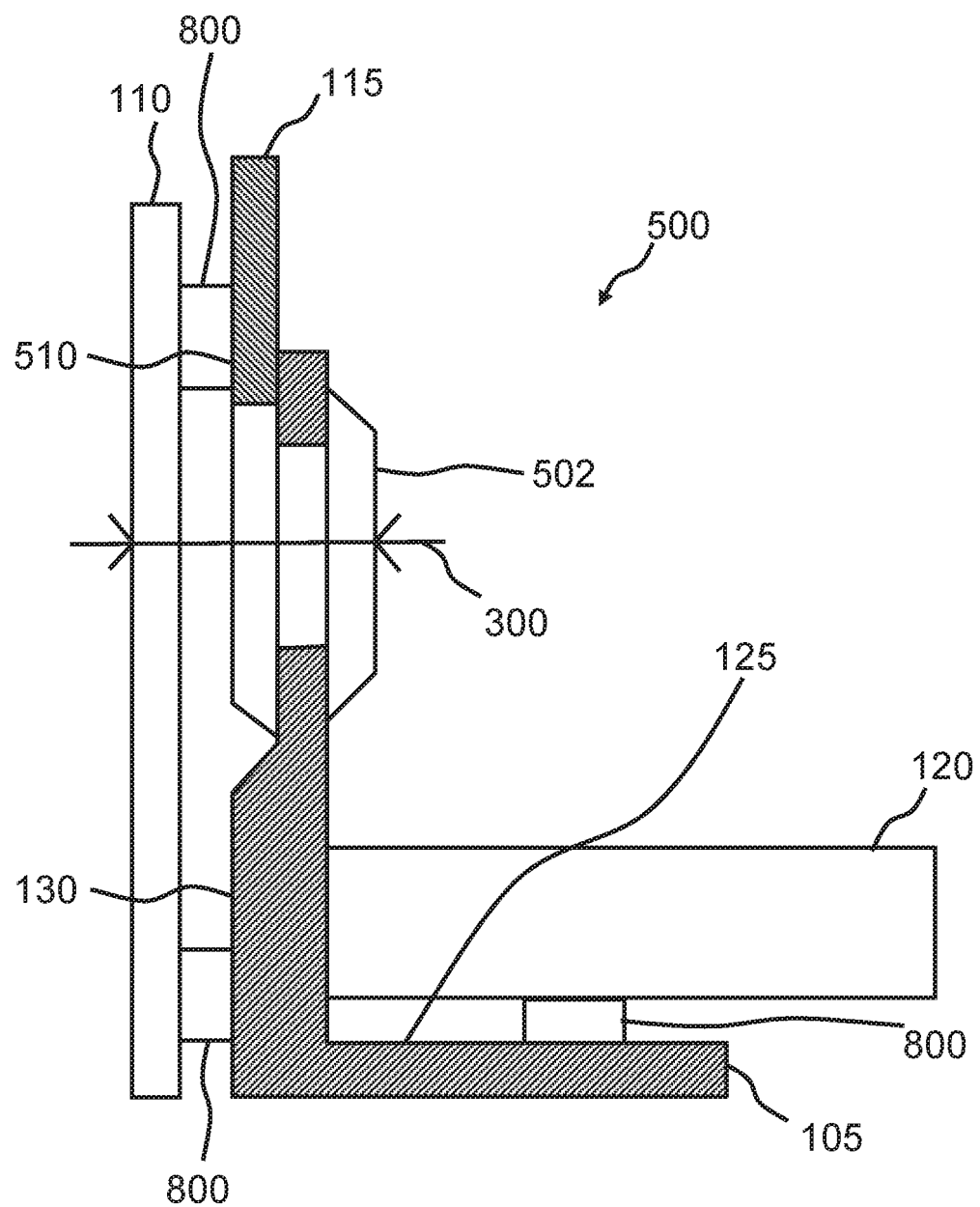
FIG. 10 is a cross-sectional view of a flexible attachment according to an exemplary embodiment.

FIG. 10 shows, in cross-sectional view, a flexible attachment 500 according to an exemplary embodiment. This may be the attachment described with reference to FIG. 8, with the difference that the attachment 500 according to this exemplary embodiment has a plurality of sealing elements 800. In addition to the sealing element 800 between clamping element 110 and exhaust funnel wall 510, attachment 500 further includes a sealing element 800 between clamping element 110 and contact surface 130, and one between vent pipe 120 and fixing element 125.

Figure 11:
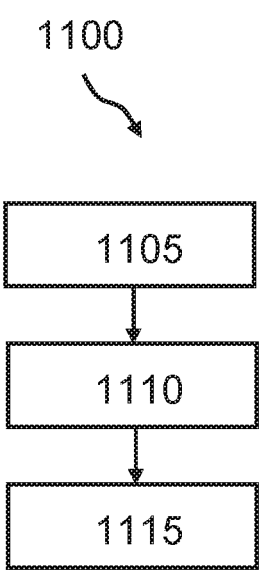
FIG. 11 is a flow chart of a method for flexibly attaching an exhaust funnel for an exhaust hood to a vent pipe in accordance with an exemplary embodiment.

FIG. 11 shows a flow chart of a method 1100 for flexibly attaching an exhaust funnel for an exhaust hood to a vent pipe in accordance with an exemplary embodiment. The exhaust funnel on the vent pipe may be any of those described with reference to the foregoing figures. In a fixing step 1105, an exhaust collar is fixed to the vent pipe. In a placement step 1110, the exhaust funnel is placed on the exhaust collar. In a final attaching step 1115, the exhaust funnel is flexibly attached to the exhaust collar using a clamping element.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An exhaust funnel device comprising:
    an exhaust collar;
    a clamping element; and
    an exhaust funnel for an exhaust hood, the exhaust funnel being flexibly attached by the clamping element to the exhaust collar and to a vent pipe,
    wherein the exhaust collar includes a tubular fixing unit configured to fix the exhaust collar to the vent pipe as well as an annular holding unit, the annular holding unit and the clamping element being configured to clamp at least a portion of an exhaust funnel wall of the exhaust funnel between the holding unit and the clamping element.

2. The exhaust funnel device of claim 1, wherein the holding unit has at least one through-hole configured to receive a fastening device configured to attach the exhaust collar to the clamping element.

3. The exhaust funnel device of claim 1, wherein an outer circumference of the fixing unit is smaller than an outer circumference of the holding unit.

4. The exhaust funnel device of claim 1, further comprising a counter-clamping element disposed on a side of a wall of the exhaust funnel opposite the clamping element and attached to the clamping element so as to clamp the holding unit and the exhaust funnel wall at least partially between the clamping element and the counter-clamping element.

5. The exhaust funnel device of claim 4, wherein the counter-clamping element and/or the clamping element have at least one through-hole configured to receive a fastening device for attaching the counter-clamping element to the clamping element.

6. The exhaust funnel device of claim 4, wherein a rear side of the holding unit is configured as a contact surface for the counter-clamping element.

7. The exhaust funnel device of claim 1, wherein at least a portion of a front side of the holding unit is configured as a contact surface for the clamping element and/or the exhaust funnel wall.

8. The exhaust funnel device of claim 1, further comprising at least one sealing element disposed between the exhaust collar and the clamping element and/or between the exhaust collar and the exhaust funnel and/or between the exhaust collar and the vent pipe.

9. The exhaust funnel device of claim 1, wherein the exhaust funnel device is fixed to the vent pipe.

10. A method for flexibly attaching an exhaust funnel for an exhaust hood to a vent pipe, the method comprising at least the following steps:
  fixing the exhaust collar of claim 1 to the vent pipe;
  placing the exhaust funnel on the exhaust collar; and
  attaching the exhaust funnel to the exhaust collar using the clamping element.

* * * * *